United States Patent [19]

Tatara

[11] 3,751,261
[45] Aug. 7, 1973

[54] VITAMIN B$_{12}$-ENRICHED FOODS TRANSFORMED FROM SEED GERMS AND ENDOCERMIS

[76] Inventor: Seizo Tatara, No. 18, Takdai-cho, Funabashi, Japan

[22] Filed: Nov. 13, 1970

[21] Appl. No.: 89,505

[52] U.S. Cl. ............................. 99/11, 195/28 VB
[51] Int. Cl. ............................................. A23l 1/30
[58] Field of Search .................... 99/11, 12, 83, 98, 99/99; 195/28 VB, 80

[56] References Cited
UNITED STATES PATENTS

| | | | |
|---|---|---|---|
| 2,773,770 | 12/1956 | Maki | 195/28 VB |
| 3,012,217 | 2/1962 | Zorn | 99/2 |
| 3,085,049 | 4/1963 | Rudy | 195/28 VB |
| 3,018,225 | 1/1962 | Parlin | 195/28 VB |

FOREIGN PATENTS OR APPLICATIONS

| | | | |
|---|---|---|---|
| 649,226 | 9/1962 | Canada | 195/28 VB |
| 637,769 | 3/1962 | Canada | 195/28 VB |

*Primary Examiner*— Norman Yudkoff
*Attorney*—Steinberg & Blake

[57] ABSTRACT

The gist of the present invention resides in a production method of mutrified foods particularly vitamin B$_{12}$—-enriched foods transformed from the seed germs, endodermis and medulla of vegetables characterized by blending crushed powders mainly constituting of vegetable seed germs and endodermis, to which vegetable medulla may be added if desired, further added with compounds of trivalent iron, calcium and magnesium and the like, blended and kneaded with an aqueous solution containing a small amount of an ammonium cobalt complex salt of an organic oxygenated acid and the like, or if desired, with said aqueous solution added with an iodine compound and fresh milk, sterilizing on heating by steaming, followed by cultivating thereon an edible mold and yeast to effect digestion and transformaton into edible and nutrified foods.

3 Claims, No Drawings

VITAMIN B$_{12}$-ENRICHED FOODS TRANSFORMED FROM SEED GERMS AND ENDOCERMIS

SUMMARY OF THE INVENTION

The present invention relates to the production of nutrified foods, particularly vitamin B$_{12}$-enriched foods transformed from vegetable seed germs, endocermis, and medulla, the non-edible wastes considered formerly into edible and healthy, nutrified foods.

DESCRIPTION OF A PREFERRED EMBODIMENT:

According to the process of the present invention, the germ-containing endodermis of vegetable seeds such as rice, wheat, soya bean and the like, after removal of the exodermis on thrashing and polishing the wastes of soya bean processing, rice-bran, wheat-bran, bean-curds husk and core medulla crashes of corn after thrashing, draff (bagasse) of sugar cane and the like are ground and mixed, to the mixture is added green leave powders, and an aqueous solution containing ammonium complex salts of organic oxygenated acids such as tartaric acid, malic acid, citric acid, etc., of essential minerals such as iron, calcium, magnesium and trace amounts of cobalt and a small amount of inorganic salts, and an aqueous solution containing hot milk added with a small amount of kalium triiodide, i.e., iodine containing milk, wherein the unsaturated fats and proteins have been added and combined with iodine, blended to dumps, steamed and sterilized by heating, mixed again after cooling with seed microorganisms belonging to one or more species of Aspergillus and Saccharomyces, made into pellets and incubated for a specified time intervals at an appropriate temperature to effect partial digestion, thus obtained milky white dumps containing microbial cells are dehydrated immediately by using a hot air- or infrared ray-heated vacuum drier to give solid matters, crushed and ground and sieved to remove remained coarse fibers, the resulted edible powders can be utilized alone or processed on addition of sugar into granules, chocolate forms or honey-candy drops as highly nutrient and healthy foods containing various essential enzymes and vitamins as well as protein.

The present process is now explained by the following embodiment:-

1. 
    a. Fresh rice-bran containing germs    27 Kg
    b. Fresh wheat-bran containing germs    25 Kg
    c. Crushed powders of corn cores    20 Kg
    d. Dried powders of confry leaves    3 g 2.
    a. Ferric ammonium citrate    250 g
    b. Calcium lactate    150 g
    c. Magnesium malate    50 g
    d. Cobalt ammonium tartrate    5 g
    e. Ferric nitrate or ferric sulfate    60 g
    f. Fresh water    25 l 3.
    a. Fresh milk    1 l
    b. Potassium triiodide    1.5 g
    c. Ammonium malate    100 g
    d. Fresh water    50 l 4.
    a. Aspergillus oryzae    100 g
    b. Aspergillus flavus    50 g
    c. Zygosaccharomyces soja    50 g According to the above formulation, the raw materials cited in (1) are freshly air-dried and mixed thoroughly. The minerals in (2) are dissolved in ca. 5$l$, of fresh water in ($f$) successively in the order of ($a$), ($b$), ($c$), ($d$), and ($e$), made alkaline by adding a small amount of ammonia, finally made up to 50$l$.

The starting materials described in (3) are prepared as follows: To 1$l$ of fresh milk is added 0.5$l$ of warm water, heated to maintain at about 60°C, and then a solution of ca. 1.5 g of potassium triiodide dissolved is about 100 cc of water is added therein gradually with stirring which results in a milky white solution after iodination, after cooling on standing, it is mixed with a solution of 100 g of ammonium lamate dissolved in 1$l$ of water separately, made up to 25$l$ with fresh water, and finally added with 50$l$ of the solution prepared in (2), with stirring to give 75$l$ of the processing solution. Thus obtained solution is further adjusted at pH 7 by adding either 5 percent citric acid solution or 10 percent aqueous ammonia, blended and kneaded on adding gradually into the raw materials of (1), made into dumps after thorough impregnation, steam-sterilized in an autoclave, and allowed to cool down to below 35°C with continuous blending, and then mixed well with the microbes stated in (4), thereupon incubated at about 37°C for approximately one day and night in a suitable incudator to afford milky white Koji-like mass with well grown mycelia, dried and dehydrated as repidly as possible under 50°C by using a hot air drier, or an infrared ray heated vacuum drier, the dried matters are now finely divided by a ball mill or an impulse grinder, sieved or pneumatically classified from unchanged coarse fiber to afford powders of edible substances having much nutriments as shown in the following table and so can be utilized as excellent healthy, nutrient foods.

Table. Results of Analysis (By Japan Food Analysis Center, Corp.)

| | |
|---|---|
| Moisture | 6.46 % |
| Crude protein | 17.74 % |
| Crude fats and oils | 21.52 % |
| Sugars | 34.33 % |
| Coarse fibers | 9.04 % |
| Crude ashes | 10.91 % |
| Calorific value | 401 Cal/100 g |
| Vitamin E | 24.2 mg% |
| Vitamin B$_6$ | 1.51 μg% |
| Vitamin B$_{12}$ | 0.25 mg% |
| Calcium | 149.59 % |
| Sodium | 1.18 % |
| Phosphorus | 2.34 mg% |
| Iron | 113.84 mg% |
| Vitamin B$_1$ | 4.32 mg% |
| Vitamin B$_2$ | 0.64 mg% |
| Nicotinic acid | 25.3 μg% |
| Follic acid | 33.9 mg% |
| Pantothenic acid | 5.06 μg% |
| Biotin | 44.3 % |
| Vitamin F | 8.52 % |
| Sucrose | 2.23 % |
| Glucose | 3.77 % |
| Fructose | 0.40 % |
| α-Amylase potency (D 40°C 30) | 4140 |
| PU | ₚH$_3$ 422.5 |
| CasFR/g | |
| retyr | ₚH$_6$ 780.0 |
| Protease potency | ₚH$_9$ 695.5 |

Thus obtained product can be used directly or after processing with sugar syrup, honey, or malt dextrose into granules, chocolate-like matter, or candy style healthy foods as it is compatible with those sugars.

Thus obtained powdery product can also be used as a bathing agent alone or in combination with other polysulfide bathing agents for the purpose of nourishing the skin, the nourishing and cosmetic effects are particularly prominent in the combination with one of the conventional bathing agents.

By the present invention, formerly abandoned wastes of vegetable seed germ-containing endodermis such as rice-bran which contains much amounts and variety of vitamins, minerals and enzyme sources essential for maintenance of the growth is being mixed with porous powders of medulla of vegetables, useful for the growth of mycellia, thereon cultivated with molds (Aspergillus) and yeasts (Saccharomyces Zygosaccharomyces) to effect partial digestion and transformation into edible matter accompanied with formation of a variety of enzymes and vitamins. It is worthy to note that nevertheless, bio-synthesis of vitamin $B_{12}$ has already been realized by liquid culture of a toxic species of Actinomyces (Strepto-myces olivaceus) in the presence of a trace amount of inorganic salts of cobalt such as cobalt chloride; in contrast, according to the present invention, accumulation and enrichment of vitamin $B_{12}$ can be effected by cultivation of the said non-toxic, edible microorganism in the presence of cobalt ammonium complex salts of organic oxygenated carboxylic acids, the said complex salts of cobalt being considered easy transformation into cyanocobalamin, namely vitamin $B_{12}$ as reflected in the table described above, though the mechanism in detail of the chemical reaction is unknown, and so, non-edible waste matters can be changed into effective healthy and nutrient foods thereby effectively.

I claim:

1. Method of converting normally non-edible vegetable waste material into edible food rich in vitamin $B_{12}$, which comprises forming a crushed mixture of seed germs and endodermis, adding thereto an aqueous solution of at least one complex salt of ammonium, an organic acid selecting from the group consisting of tartaric acid, malic acid, citric acid and lactic acid, and a metal selected from the group consisting of iron, calcium, magnesium and cobalt, and also adding thereto an aqueous solution of hot iodinated milk, adding thereto seed microorganisms selected from the group consisting of the species of Aspergillus and Saccharomyces, incubating the thus formed mixture to obtain partial digestion thereof, dehydrating the resulting mixture, thus obtaining a solid residue, crushing the thus remaining solid residue and removing coarse fibers therefrom, thus obtaining an edible powder containing enzymes, vitamins and protein.

2. Method according to claim 1 wherein vegetable medulla is added to said mixture of seed germs and endodermis.

3. Method according to claim 2 wherein said seed microorganisms are selected from the group consisting of Aspergillus oryzae, Aspergillus flavus, and Zygosaccharomyces sojae.

* * * * *